(12) United States Patent
Min

(10) Patent No.: US 12,637,094 B2
(45) Date of Patent: May 26, 2026

(54) APPARATUS AND METHOD FOR SETTING FAULT-TOLERANT TIME INTERVAL WHEN VEHICLE DRIVING

(71) Applicant: HL MANDO CORPORATION, Pyeongtaek-si (KR)

(72) Inventor: Hyogi Min, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 160 days.

(21) Appl. No.: 18/806,143

(22) Filed: Aug. 15, 2024

(65) Prior Publication Data

US 2025/0282365 A1    Sep. 11, 2025

(30) Foreign Application Priority Data

Mar. 7, 2024    (KR) ......................... 10-2024-0032610

(51) Int. Cl.
B60W 50/02        (2012.01)
B60R 16/023      (2006.01)
B62D 5/04        (2006.01)

(52) U.S. Cl.
CPC .................. B60W 50/0205 (2013.01); B60W 2050/0215 (2013.01); B60W 2540/223 (2020.02)

(58) Field of Classification Search
CPC ..... B60W 50/0205; B60W 2050/0215; B60W 2540/223; B62D 5/049; B62D 1/046; B60R 16/0232; B60Y 2306/15
USPC ..................................................... 701/1, 30.5
See application file for complete search history.

(56) References Cited

U.S. PATENT DOCUMENTS

| | | | | |
|---|---|---|---|---|
| 7,245,995 B2 * | 7/2007 | Kueperkoch | ...... | B60G 17/0185 |
| | | | | 701/33.9 |
| 7,254,470 B2 * | 8/2007 | Colosky | ................... | G01D 3/08 |
| | | | | 340/439 |
| 8,175,773 B2 * | 5/2012 | Nishimori | ............ | B62D 5/0493 |
| | | | | 180/443 |
| 9,387,882 B2 * | 7/2016 | Han | ...................... | B62D 15/021 |
| 10,340,827 B2 * | 7/2019 | Pramod | .................. | B62D 5/049 |
| 10,673,364 B2 * | 6/2020 | Ghaderi | .............. | G07C 5/0816 |

(Continued)

OTHER PUBLICATIONS

Liu et al.; "Optimal Design of Fault-Tolerant Controller for an Electric Power Steering System with Sensor Failures Using Genetic Algorithm"; 2018; Shock and Vibration—vol. 2018, Article ID 1801589, 10 pages; https://doi.org/10.1155/2018/1801589 (Year: 2018).*

(Continued)

*Primary Examiner* — Jaime Figueroa
(74) *Attorney, Agent, or Firm* — Studebaker Brackett PLLC

(57)        ABSTRACT

The present disclosure relates to an apparatus and method for setting a fault-tolerant time interval when vehicle driving, and includes a memory comprising at least one instruction; and at least one processor configured to execute the at least one instruction stored in the memory, wherein the at least one processor is configured to identify whether sensing data is obtained from a sensor provided in a handle of a vehicle when a malfunction is detected in at least one torque sensor provided in driving vehicle, and set a fault-tolerant time interval (FTTI) to increase according to a predetermined reference value in the vehicle when the sensing data is obtained, and is applicable to other embodiments.

15 Claims, 3 Drawing Sheets

(56)         References Cited

U.S. PATENT DOCUMENTS

| | | | | |
|---|---|---|---|---|
| 11,332,186 | B2 * | 5/2022 | Kurihara | B62D 5/0463 |
| 11,496,076 | B2 * | 11/2022 | Pramod | H02P 6/10 |
| 11,827,292 | B2 * | 11/2023 | Larminy | G08G 1/166 |
| 12,195,109 | B2 * | 1/2025 | Zhao | B62D 5/0487 |
| 2003/0233181 | A1 * | 12/2003 | Colosky | G01D 3/08 |
| | | | | 180/443 |
| 2004/0162650 | A1 * | 8/2004 | Kueperkoch | B60T 8/885 |
| | | | | 701/29.2 |
| 2005/0162292 | A1 * | 7/2005 | Kanekawa | H03M 1/1076 |
| | | | | 341/111 |
| 2015/0344070 | A1 * | 12/2015 | Han | B62D 15/021 |
| | | | | 701/41 |
| 2019/0013930 | A1 * | 1/2019 | Munir | H04L 9/0631 |
| 2019/0018408 | A1 * | 1/2019 | Gulati | G07C 5/0808 |
| 2019/0111969 | A1 * | 4/2019 | Pramod | B62D 5/0484 |
| 2019/0140566 | A1 * | 5/2019 | Pramod | H02P 29/60 |
| 2019/0190422 | A1 * | 6/2019 | Ghaderi | H02P 21/18 |
| 2021/0269087 | A1 * | 9/2021 | Zhao | B62D 5/0484 |
| 2022/0266896 | A1 | 8/2022 | Kim et al. | |

OTHER PUBLICATIONS

Lawson et al; "Fault Tolerant Control for an Electric Power Steering System"; 2008—IEEE; 17th IEEE International Conference on Control Applications Part of 2008 IEEE Multi-conference on Systems and Control San Antonio, Texas, USA, Sep. 3-5, 2008, pp. 486-491. (Year: 2008).*

A Notice of Allowance mailed by the Korean Ministry of Intellectual Property on Dec. 18, 2025, which corresponds to Korean Patent Application No. 10-2024-0032610 and is related to U.S. Appl. No. 18/806,143.

* cited by examiner

APPARATUS AND METHOD FOR SETTING FAULT-TOLERANT TIME INTERVAL WHEN VEHICLE DRIVING

CROSS-REFERENCE TO RELATED APPLICATION

This application claims priority to and the benefit of Korean Patent Application No. 10-2024-0032610, filed on Mar. 7, 2024, the disclosures of which is incorporated herein by reference in its entirety.

FIELD

The present disclosure relates to an apparatus and method for setting a fault-tolerant time interval when vehicle driving.

BACKGROUND

An electric power steering (EPS) system is a system that uses a processor to adjust the power steering characteristics of a handle by controlling the amount of assist for driving a motor. The processor is a control device that receives electrical signals detected by various input sensors of the vehicle and outputs digital control signals to driving various actuators on the output side.

When the driver operates the handle, the torque sensor detects the driver's handle torque input and transmits it to the processor, and the motor is driven by a command of the processor receiving the handle torque input and assists the steering, so that the EPS system controls the power steering characteristics of the handle. That is, the processor may control the power steering of the handle to become lighter when the vehicle speed is low, and may control the power steering of the handle to become heavier when the vehicle speed is high.

Recently, Fault-tolerant time interval (FTTI), which is a failure detection time for detecting the failure of the EPS system, has been applied due to the spread of autonomous vehicles. In this case, when the FTTI is set to be large, there is a problem that a malfunction phenomenon generated in the vehicle cannot be detected early, and when the FTTI is set to be low, the malfunction phenomenon generated in the vehicle is sensitively detected, resulting in problems such as warning lights occurring and assist not being possible. In particular, in order to prevent sensitive detection of malfunctions, a sensor with high resolution or a CPU with high response and processing speed must be applied, which inevitably leads to an increase in costs.

Therefore, there is an emerging need to develop a technology that can set an appropriate FTTI in real time or periodically when a malfunction phenomenon occurs in a vehicle without installing a separate sensor.

SUMMARY

Embodiments of the present disclosure for solving the conventional problems provide an apparatus and method for setting a fault-tolerant time interval when vehicle driving, which may set an appropriate fault-tolerant time interval (FTTI) when a malfunction occurs in the vehicle using sensing data obtained from a sensor mounted on a handle of the vehicle.

According to an embodiment of the present disclosure, an apparatus for setting fault-tolerant time interval when vehicle driving includes a memory including at least one instruction; and at least one processor configured to execute the at least one instruction stored in the memory, wherein the at least one processor is configured to identify whether sensing data is obtained from a sensor provided in a handle of a vehicle when a malfunction is detected in at least one torque sensor provided in driving vehicle, and set a fault-tolerant time interval (FTTI) to increase according to a predetermined reference value in the vehicle when the sensing data is obtained.

In addition, the at least one processor may differentially set the FTTI according to a touch state and a grasp state of the handle identified from the sensing data.

In addition, the at least one processor may set the FTTI to decrease when the sensing data is not obtained.

In addition, the at least one processor may identify an operation result value for sensing data obtained from the at least one torque sensor when the malfunction is not detected in the at least one torque sensor, and identify whether a malfunction is generated in the vehicle based on the operation result value.

In addition, the at least one processor may identify the operation result value based on the sensing data obtained from the torque sensor using a first algorithm and a second algorithm.

In addition, the at least one processor may identify that the malfunction is generated in the vehicle when a difference between the operation result value identified by the first algorithm and the operation result value identified by the second algorithm is greater than or equal to a threshold value.

In addition, the at least one processor may compare each sensing data obtained by the first torque sensor and the second torque sensor provided in the vehicle, and detect whether the at least one torque sensor malfunctions based on whether each sensing data is the same.

In addition, the at least one processor may include a first processor and a second processor, and the first processor and the second processor apply the first algorithm and the second algorithm, respectively.

In addition, according to an embodiment of the present disclosure, a method of setting a fault-tolerant time interval when vehicle driving may include detecting, using an electronic apparatus, a malfunction in at least one torque sensor provided in driving vehicle; identifying, using an electronic apparatus, whether sensing data is obtained from a sensor provided in a handle of the vehicle when the malfunction is detected in at least one torque sensor; and setting, using an electronic apparatus, a fault-tolerant time interval (FTTI) to increase according to a predetermined reference value in the vehicle when the sensing data is obtained from a sensor provided in the handle.

In addition, the setting the FTTI to increase may be differentially setting the FTTI according to a touch state and a grasp state of the handle identified from the sensing data.

In addition, the method may further include setting, using an electronic apparatus, the FTTI to decrease when the sensing data is not obtained.

In addition, the method may further include after the detecting whether the at least one torque sensor malfunctions, identifying, using an electronic apparatus, an operation result value for sensing data obtained from the at least one torque sensor when the malfunction is not detected in the at least one torque sensor; and identifying, using an electronic apparatus, whether a malfunction is generated in the vehicle based on the operation result value.

In addition, the identifying the operation result value may be identifying the operation result value based on the sensing data obtained from the torque sensor using a first algorithm and a second algorithm.

In addition, the identifying whether the malfunction is generated in the vehicle may be identifying that the malfunction is generated in the vehicle when a difference between the operation result value identified by the first algorithm and the operation result value identified by the second algorithm is greater than or equal to a threshold value.

In addition, the detecting whether the at least one torque sensor malfunctions may include comparing each sensing data obtained by the first torque sensor and the second torque sensor provided in the vehicle; and detecting whether the at least one torque sensor malfunctions based on whether each sensing data is the same.

As described above, the apparatus and method for setting a fault-tolerant time interval when vehicle driving according to the present disclosure have the effect of setting an appropriate fault-tolerant time interval (FTTI) when the occurrence of a malfunction phenomenon of the vehicle by using sensing data obtained from a sensor mounted on a handle of the vehicle, so that the FTTI can be set in real time or periodically without installing a separate sensor, and there is a cost saving effect because there is no need to install the separate sensor.

DETAILED DESCRIPTION

Figure 1:
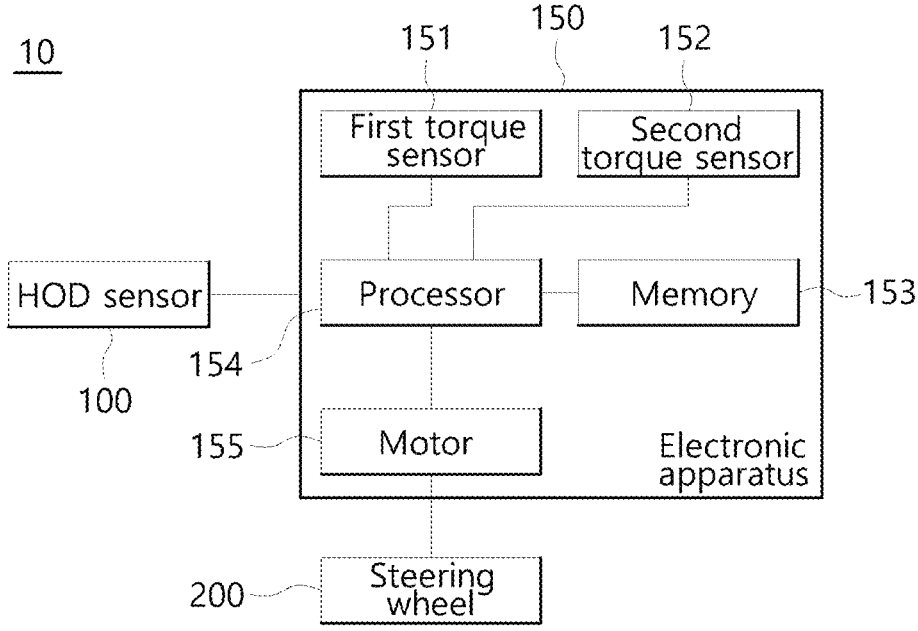
FIG. 1 is a diagram showing a main configuration of a system for setting a fault-tolerant time interval according to an embodiment of the present disclosure.

Hereinafter, preferred embodiments according to the present disclosure will be described in detail with reference to the accompanying drawings. The detailed description that will be disclosed below together with the accompanying drawings is intended to explain exemplary embodiments of the present disclosure, and is not intended to represent the only embodiments in which the present disclosure can be practiced. In the drawings, parts irrelevant to the description may be omitted to clearly explain the present disclosure, and the same reference numerals may be used for the same or similar components throughout the specification.

FIG. 1 is a diagram showing a main configuration of a system for setting a fault-tolerant time interval according to an embodiment of the present disclosure.

Referring to FIG. 1, the system 10 according to the present disclosure may include a hands on detection (HOD) sensor 100, an electronic apparatus 150, and a steering wheel 200. In addition, FIG. 1 may be applied when the vehicle's autonomous driving level is level 1 and level 2.

The HOD sensor 100 is a sensor provided in the handle of the vehicle, and may be a sensor that may detect a micro-current generated by a driver' hand when the driver touches or grasps the handle. The HOD sensor 100 provides the detected sensing data (hereinafter, referred to as third sensing data) to the electronic apparatus 150.

When a malfunction is detected in at least one torque sensor provided in the driving vehicle, the electronic apparatus 150 identifies whether the third sensing data is obtained from the HOD sensor 100 provided in the handle of the vehicle, and sets a fault-tolerant time interval to decrease or increase depending on whether the third sensing data is obtained. To this end, the electronic apparatus 150 may include a first torque sensor 151, a second torque sensor 152, a memory 153, a processor 154, and a motor 155. The electronic apparatus 150 may be an electric power steering (EPS) system that adjusts the power steering characteristics of the handle by controlling the amount of assist for driving the motor 155.

The first torque sensor 151 and the second torque sensor 152 are sensors that obtain first sensing data and second sensing data for the steering torque of the driving vehicle, respectively. The first torque sensor 151 and the second torque sensor 152 obtain the sensing data for the steering torque when vehicle driving and provide the sensing data to the processor 154. In this case, the first torque sensor 151 may be a main sensor, and the second torque sensor 152 may be a sub-sensor.

The memory 153 may store a program for controlling the electronic apparatus 150. In particular, the memory 153 may store a detection algorithm that may identify whether to detect a malfunction in at least one of the first torque sensor 151 and the second torque sensor 152 based on the first sensing data and the second sensing data received from the first torque sensor 151 and the second torque sensor 152.

The memory 153 may store a first algorithm and a second algorithm that may identify whether to detect a malfunction in the electronic apparatus 150 by applying the first sensing data and the second sensing data. In this case, the first algorithm may be an algorithm for calculating an actual operation result value related to driving of the vehicle based on the first sensing data and the second sensing data obtained according to driving of the vehicle, and the second algorithm may be an algorithm for identifying consistency of the actual operation result value calculated by the first algorithm. In addition, the memory 153 may store a reference value that is a maximum value when setting the FTTI to increase.

The processor 154 identifies whether the vehicle starts driving. When it is identified that the vehicle starts driving, the processor 154 identifies whether the malfunction is detected in at least one torque sensor among the first torque sensor 151 and the second torque sensor 152 based on the first sensing data and the second sensing data received from the first torque sensor 151 and the second torque sensor 152. More specifically, the processor 154 applies the first sensing data and the second sensing data to the detection algorithm stored in the memory 153 to compare them. The processor 154 may identify that when the two sensing data differ by a threshold value or more, the malfunction is detected in the torque sensor. At this time, the processor 154 may detect hardware damage such as a device or circuit damage of the torque sensor as a torque sensor malfunction.

Conversely, the processor 154 identifies that when the two sensing data are similar or identical to less than the threshold, no malfunction is detected in the torque sensor. When it is identified that no malfunction is detected in the torque sensor, the processor 154 applies the first sensing data and the second sensing data to the first algorithm and the second algorithm stored in the memory 153. The processor 154 may apply the first sensing data and the second sensing data to the first algorithm to calculate the operation result value, and may apply the first sensing data and the second sensing data to the second algorithm to calculate the operation result value. In this case, the first algorithm and the second algorithm are algorithms for pre-processing the first sensing data and the second sensing data, and may mean an algorithm that calculates an operation result value by performing operations such as converting the first sensing data and the second sensing data into a torque value.

The processor 154 compares the operation result values calculated from each of the first algorithm and the second algorithm. When the difference between the two operation result values is greater than or equal to the threshold value or the difference between the operation result values is greater than or equal to the threshold value and is maintained for a threshold time or longer, the processor 154 identifies the differences as a software error such as a code defect or operation delay of the first or second algorithm, and determines that the malfunction is detected in the electronic apparatus 150, that is, the EPS system. Conversely, the processor 154 may identify that when the two operation result values are similar or identical to those of the threshold value, a separate malfunction has not been detected in the EPS system.

When it is identified that a malfunction is detected in the torque sensor or the EPS system, the processor 154 identifies whether third sensing data is obtained from the hands on detection (HOD) sensor 100 provided in the handle of the vehicle. When the third sensing data is not obtained, the processor 154 identifies that the driver is not touching or grasping the handle of the vehicle and sets the fault-tolerant time interval (FTTI) to decrease.

Conversely, when the third sensing data is obtained from the HOD sensor 100, the processor 154 identifies that the driver is touching or grasping the handle of the vehicle and sets FTTI to increase. At this time, the processor 154 may determine whether the driver is touching or grasping the handle of the vehicle based on the third sensing data and set the FTTI differently depending on the state. For example, when the driver is grasping the handle of the vehicle, the FTTI may be set to increase by the reference value stored in the memory 153, and when the driver is touching the handle of the vehicle, the FTTI may be set to increase, but lower than the reference value.

The processor 154 may perform the corresponding function based on the set FTTI. For example, the processor 154 sets FTTI to decrease when the third sensing data is not obtained while the malfunction is detected in the torque sensor or EPS system of the vehicle. The processor 154 may display a warning light that is generated whenever the reduced FTTI arrives and a message notifying that steering assist is not possible and that the driver must directly control the steering. In this way, when the FTTI is reduced and set short, situations in which the warning lights and the steering assist are not possible are sensitively detected, so the driver may be encouraged to participate in real-time steering control to ensure safety when vehicle driving.

In addition, when the third sensing data is obtained in a state where the malfunction is detected in the torque sensor or EPS system of the vehicle, the processor 154 sets FTTI to increase. The processor 154 may prevent sensitive detection by setting the FTTI to increase and display the warning light that is generated whenever the FTTI arrives and the message notifying that steering assist is not possible and the driver must directly control the steering. As described above, when the third sensing data is obtained while the malfunction is detected in the torque sensor or the EPS system, the processor 154 may determine that the driver is controlling the steering by using the handle, and may encourage the driver to participate in the steering control when it is determined that the driver's steering control is necessary at the time of arrival of FTTI.

In addition, the processor 154 adjusts the amount of assist based on the set FTTI and provides a current corresponding to the adjusted amount of assist to the motor 155.

The motor 155 is controlled according to a current corresponding to the amount of assist adjusted based on the FTTI set by the processor 154.

The steering wheel 200 may adjust the power steering characteristics of the handle according to the control of the motor 155.

Figure 2:
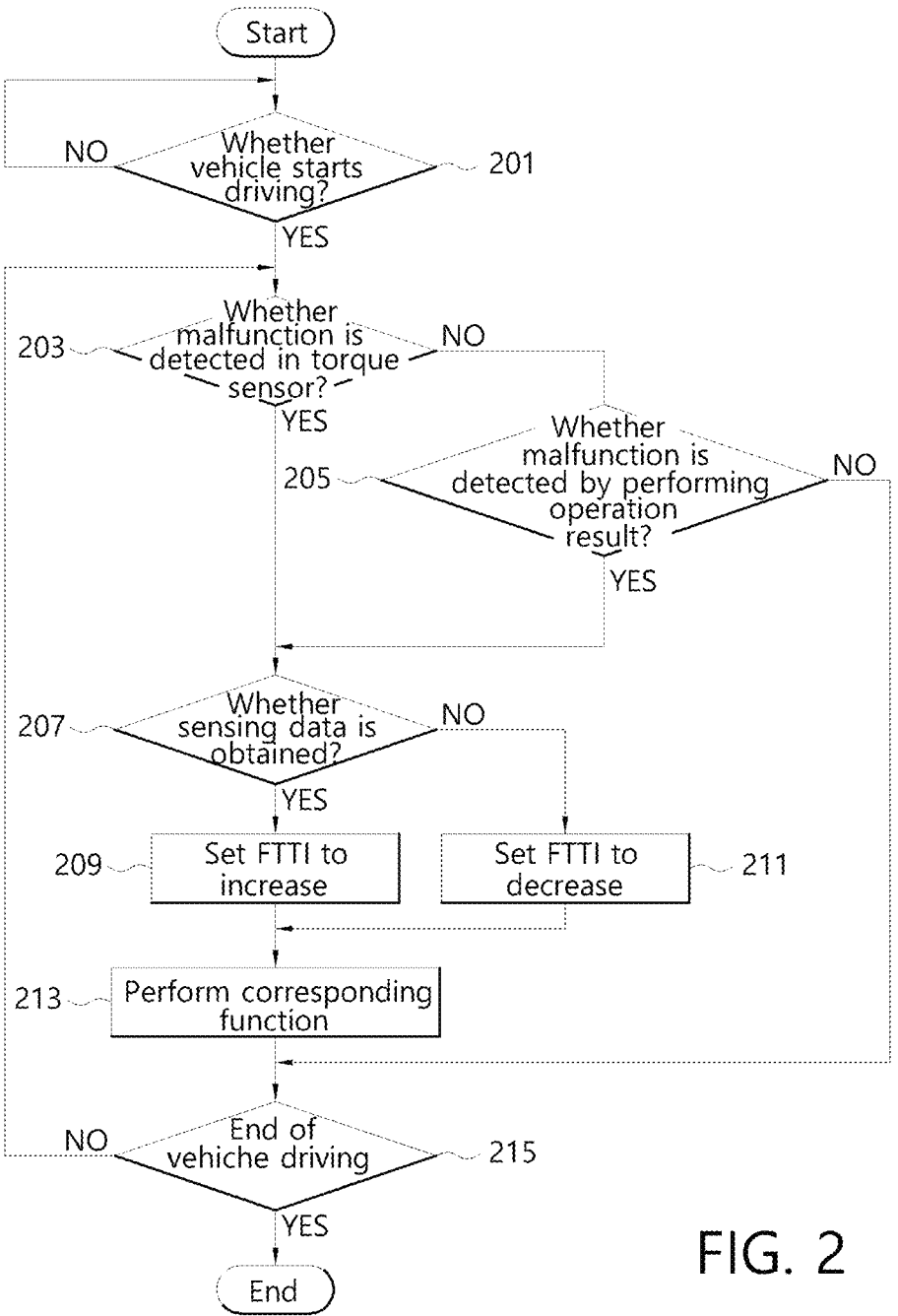
FIG. 2 is a flowchart for describing a method of setting a fault-tolerant time interval according to an embodiment of the present disclosure.

FIG. 2 is a flowchart for describing a method of setting a fault-tolerant time interval according to an embodiment of the present disclosure.

Referring to FIG. 2, in step S201, the processor 154 identifies whether the vehicle starts driving. As a result of the step S201, when it is identified that the vehicle starts driving, the processor 154 performs step S203, and when the driving start is not identified, the processor 154 continuously identifies whether the vehicle starts driving.

In step S203, the processor 154 identifies whether the malfunction is detected in at least one torque sensor among the first torque sensor 151 and the second torque sensor 152 based on the first sensing data and the second sensing data received from the first torque sensor 151 and the second torque sensor 152. More specifically, the processor 154 applies the first sensing data and the second sensing data to the detection algorithm to compare them. The processor 154 identifies that when the two sensing data differ by a threshold value or more, the malfunction is detected in the torque sensor and performs step S207. At this time, the processor 154 may detect hardware damage such as a device or circuit damage of the torque sensor as a torque sensor malfunction.

Conversely, the processor 154 identifies that when the two sensing data are similar or identical to less than the threshold, no malfunction is detected in the torque sensor, and performs step S205.

In step S205, the processor 154 may apply the first sensing data and the second sensing data to the first algorithm to calculate the operation result value, and may apply the first sensing data and the second sensing data to the second algorithm to calculate the operation result value. In this case, the first algorithm and the second algorithm are algorithms for pre-processing the first sensing data and the second sensing data, and may mean an algorithm that calculates an operation result value by performing operations such as converting the first sensing data and the second sensing data into a torque value.

The processor 154 compares the calculated results of each of the first algorithm and the second algorithm. When the difference between the two operation result values is greater than or equal to the threshold value or the difference between the operation result values is greater than or equal to the threshold value and is maintained for a threshold time or longer, the processor 154 identifies the differences as a software error such as a code defect or operation delay of the first or second algorithm, and determines that the malfunction is detected in the electronic apparatus 150, that is, the EPS system. When it is identified that the malfunction is detected in the EPS system, the processor 154 performs step S207. On the contrary, when the two operation result values are similar or identical to those of the threshold value, it is identified that a separate malfunction has not been detected in the EPS system.

In step 207, the processor 154 identifies whether third sensing data is obtained from the hands on detection (HOD)

sensor 100 provided in the handle of the vehicle. When it is identified that the third sensing data is obtained as a result of step S207, the processor 154 performs step S209, and when it is identified that the third sensing data is not obtained, the processor 154 performs step S211. In step S211, since the third sensing data is not obtained, the processor 154 identifies that the driver is not touching or grasping the handle of the vehicle and sets the fault-tolerant time interval (FTTI) to decrease, and performs step S213. For example, the processor 154 may set the FTTI to 20 ms.

On the other hand, if it is identified that the third sensing data is obtained, the processor 154 may perform the step S213 after setting the FTTI to increase by identifying that the driver is touching or grasping the handle of the vehicle in step S209. At this time, the processor 154 may determine whether the driver is touching or grasping the handle of the vehicle based on the third sensing data and set the FTTI differently depending on the state. For example, when the driver is grasping the handle of the vehicle, the FTTI may be set to increase by the reference value stored in the memory 153, for example, to be set to 70 ms, and when the driver is touching the handle of the vehicle, the FTTI may be set to increase, for example, to be set to 50 ms lower than 70 ms.

In step S213, the processor 154 may perform the corresponding function based on the set FTTI. For example, the processor 154 sets FTTI to decrease when the third sensing data is not obtained while the malfunction is detected in the torque sensor or EPS system of the vehicle. The processor 154 may display a warning light that is generated whenever the reduced FTTI arrives and a message notifying that steering assist is not possible and that the driver must directly control the steering. In this way, when the FTTI is reduced and set short, situations in which the warning lights and the steering assist are not possible are sensitively detected, so the driver may be encouraged to participate in real-time steering control to ensure safety when the vehicle driving.

In addition, when the third sensing data is obtained in a state where the malfunction is detected in the torque sensor or EPS system of the vehicle, the processor 154 sets FTTI to increase. The processor 154 may prevent sensitive detection by setting the FTTI to increase and display the warning light that is generated whenever the FTTI arrives and the message notifying that steering assist is not possible and the driver must directly control the steering. As described above, when the third sensing data is obtained while the malfunction is detected in the torque sensor or the EPS system, the processor 154 may determine that the driver is controlling the steering by using the handle, and may encourage the driver to participate in the steering control when it is determined that the driver's steering control is necessary at the time of arrival of FTTI.

In addition, in step S213, the processor 154 adjusts the amount of assist based on the set FTTI and provides a current corresponding to the adjusted amount of assist to the motor 155. The motor 155 is controlled according to the current, and The steering wheel 200 adjusts the power steering characteristics of the handle according to the control of the motor 155.

In step S215, the processor 154 may terminate the corresponding process when the end of the driving of the vehicle is detected, and return to step S203 when the end of the driving of the vehicle is not detected, and repeatedly perform steps S203 to S213.

Figure 3:
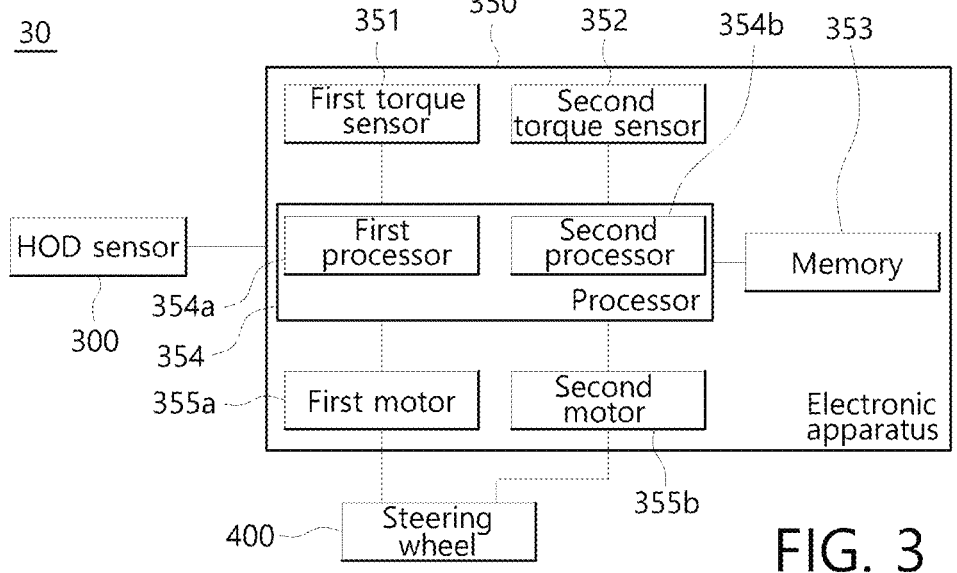
FIG. 3 is a diagram illustrating a main configuration of a system for setting a fault-tolerant time interval according to another embodiment of the present disclosure.

FIG. 3 is a diagram illustrating a main configuration of a system for setting a fault-tolerant time interval according to another embodiment of the present disclosure.

Referring to FIG. 3, the system 30 according to another embodiment of the present disclosure may include a hands on detection (HOD) sensor 300, an electronic apparatus 350, and a steering wheel 400 as shown in FIG. 1. In addition, FIG. 3 may be applied when the vehicle's autonomous driving level is level 3.

Since the HOD sensor 300 performs the same function as the HOD sensor 100 shown in FIG. 1, a detailed description thereof will be omitted.

When a malfunction is detected in at least one torque sensor provided in the driving vehicle, the electronic apparatus 350 identifies whether the third sensing data is obtained from the HOD sensor 300 provided in the handle of the vehicle, and when the third sensing data is obtained, sets a fault-tolerant time interval to increase according to a predetermined reference value in the vehicle. To this end, the electronic apparatus 350 may include a first torque sensor 351, a second torque sensor 352, a memory 353, a processor 354, a first motor 355*a*, and a second motor 355*b*.

At this time, the first torque sensor 351, the second torque sensor 352, and the memory 153 perform the same function as the first torque sensor 151, the second torque sensor 152, and the memory 153 shown in FIG. 1, and thus a detailed description thereof will be omitted.

The processor 354 may include a first processor 354*a* and a second processor 354*b*, and the first processor 354*a* and the second processor 354*b* may perform separately the functions of the processor 154 shown in FIG. 1. In this case, the first processor 354*a* may perform the role of the main processor.

For example, the first processor 354*a* receives first sensing data and second sensing data from the first torque sensor 351 and the second torque sensor 352, and the second processor 354*b* receives the first sensing data and the second sensing data from the first torque sensor 351 and the second torque sensor 352. The first processor 354*a* compares the first sensing data and the second sensing data by applying the first sensing data and the second sensing data obtained by the first torque sensor 351 and the second torque sensor 352 to a detection algorithm. The first processor 354*a* may identify that when the two sensing data differ by a threshold or more, the malfunction is detected in the torque sensor. The first processor 354*a* may detect hardware damage such as a device or circuit damage of the torque sensor as a torque sensor malfunction.

Conversely, the first processor 354*a* identifies that when the two sensing data are similar or identical to less than the threshold, no malfunction is detected in the torque sensor. When it is identified that no malfunction is detected in the torque sensor, the first processor 354*a* calculates the operation result values for the first sensing data and the second sensing data using a first algorithm stored in the memory 353. The second processor 354*b* calculates the calculation result values for the first sensing data and the second sensing data using a second algorithm stored in the memory 353.

The first processor 354*a* may receive the operation result value calculated by the second processor 354*b* and detect whether the EPS system is malfunction. More specifically, the first processor 354*a* compares the operation result value calculated by the first processor 354*a* with the operation result value calculated by the second processor 354*b*. When the difference between the two operation result values is greater than or equal to the threshold value or the difference between the operation result values is greater than or equal to the threshold value and is maintained for a threshold time or longer, the first processor 354*a* identifies the differences as a software error such as a code defect or operation delay of the first or second algorithm, and determines that the malfunction is detected in the electronic apparatus 350, that is, the EPS system. Conversely, the first processor 354a may identify that when the two operation result values are similar or identical to those of the threshold value, a separate malfunction has not been detected in the EPS system.

When the first processor 354a identifies that a malfunction is detected in the torque sensor or the EPS system, the first processor 354a identifies whether the third sensing data is obtained from the HOD sensor 300 provided in the handle of the vehicle. When the third sensing data is not obtained, the first processor 354a identifies that the driver is not touching or grasping the handle of the vehicle and sets the fault-tolerant time interval (FTTI) to decrease.

Conversely, when the third sensing data is obtained from the HOD sensor 300, the first processor 354a identifies that the driver is touching or grasping the handle of the vehicle and sets FTTI to increase. At this time, the first processor 354a may determine whether the driver is touching or grasping the handle of the vehicle based on the third sensing data and set the FTTI differently depending on the state. For example, when the driver is grasping the handle of the vehicle, the FTTI may be set to increase by the reference value stored in the memory 353, and when the driver is touching the handle of the vehicle, the FTTI may be set to increase, but lower than the reference value.

The first motor 355a and the second motor 355b are controlled according to a current corresponding to the amount of assist adjusted based on the FTTI set by the first processor 354a. At this time, the first motor 355a may serve as a main motor, and when an error occurs in the first motor 355a, the second motor 355b may serve as the first motor 355a instead.

The steering wheel 400 may adjust the power steering characteristics of the handle according to the control of the first motor 355a or the second motor 355b.

The embodiments of the present disclosure disclosed in this specification and the drawings are merely presented to easily explain the technical contents of the present disclosure and to help understand the present disclosure, and the scope of the present disclosure is not intended to be limited. Therefore, it should be interpreted that all changes or modified forms derived based on the technical spirit of the present disclosure are included in the scope of the present disclosure in addition to the embodiments disclosed herein.

What is claimed is:

1. An electronic apparatus, comprising:
a memory comprising at least one instruction; and
at least one processor configured to execute the at least one instruction stored in the memory,
wherein the at least one processor is configured to:
identify whether sensing data is obtained from a sensor provided in a handle of a vehicle when a malfunction is detected in at least one torque sensor provided in driving vehicle, and
set a fault-tolerant time interval (FTTI) to increase according to a predetermined reference value in the vehicle when the sensing data is obtained.

2. The electronic apparatus of claim 1, wherein the at least one processor is configured to differentially set the FTTI according to a touch state and a grasp state of the handle identified from the sensing data.

3. The electronic apparatus of claim 1, wherein the at least one processor is configured to set the FTTI to decrease when the sensing data is not obtained.

4. The electronic apparatus of claim 1, wherein the at least one processor is configured to:
identify an operation result value for sensing data obtained from the at least one torque sensor when the malfunction is not detected in the at least one torque sensor, and
identify whether a malfunction is generated in the vehicle based on the operation result value.

5. The electronic apparatus of claim 4, wherein the at least one processor is configured to identify the operation result value based on the sensing data obtained from the at least one torque sensor using a first algorithm and a second algorithm.

6. The electronic apparatus of claim 5, wherein the at least one processor is configured to identify that the malfunction is generated in the vehicle when a difference between the operation result value identified by the first algorithm and the operation result value identified by the second algorithm is greater than or equal to a threshold value.

7. The electronic apparatus of claim 1, wherein the at least one processor is configured to:
compare each sensing data obtained by a first torque sensor and a second torque sensor provided in the vehicle, and
detect whether the at least one torque sensor malfunctions based on whether each sensing data is the same.

8. The electronic apparatus of claim 5, wherein the at least one processor comprises a first processor and a second processor, and
the first processor and the second processor apply the first algorithm and the second algorithm, respectively.

9. A method for setting a fault-tolerant time interval, comprising:
detecting, using an electronic apparatus, a malfunction in at least one torque sensor provided in driving vehicle;
identifying, using an electronic apparatus, whether sensing data is obtained from a sensor provided in a handle of the vehicle when the malfunction is detected in at least one torque sensor; and
setting, using an electronic apparatus, a fault-tolerant time interval (FTTI) to increase according to a predetermined reference value in the vehicle when the sensing data is obtained from a sensor provided in the handle.

10. The method of claim 9, wherein the setting the FTTI to increase is differentially setting the FTTI according to a touch state and a grasp state of the handle identified from the sensing data.

11. The method of claim 9, further comprising:
setting, using an electronic apparatus, the FTTI to decrease when the sensing data is not obtained.

12. The method of claim 9, further comprising:
after the detecting whether the at least one torque sensor malfunctions,
identifying, using an electronic apparatus, an operation result value for sensing data obtained from the at least one torque sensor when the malfunction is not detected in the at least one torque sensor; and
identifying, using an electronic apparatus, whether a malfunction is generated in the vehicle based on the operation result value.

13. The method of claim 12, wherein the identifying the operation result value is identifying the operation result value based on the sensing data obtained from the at least one torque sensor using a first algorithm and a second algorithm.

14. The method of claim 13, wherein the identifying whether the malfunction is generated in the vehicle is identifying that the malfunction is generated in the vehicle when a difference between the operation result value identified by the first algorithm and the operation result value identified by the second algorithm is greater than or equal to a threshold value.

15. The method of claim 9, wherein the detecting whether the at least one torque sensor malfunctions comprising:

comparing each sensing data obtained by a first torque sensor and a second torque sensor provided in the vehicle; and detecting whether the at least one torque sensor malfunctions based on whether each sensing data is the same.

\* \* \* \* \*